United States Patent
Lothspeich et al.

(10) Patent No.: US 10,841,085 B2
(45) Date of Patent: Nov. 17, 2020

(54) METHOD FOR GENERATING A SECRET OR A KEY IN A NETWORK

(71) Applicant: Robert Bosch GmbH, Stuttgart (DE)

(72) Inventors: Timo Lothspeich, Weissach (DE); Andreas Mueller, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 435 days.

(21) Appl. No.: 15/575,839

(22) PCT Filed: Apr. 13, 2016

(86) PCT No.: PCT/EP2016/058103
§ 371 (c)(1),
(2) Date: Nov. 21, 2017

(87) PCT Pub. No.: WO2016/188667
PCT Pub. Date: Dec. 1, 2016

(65) Prior Publication Data
US 2018/0123786 A1    May 3, 2018

(30) Foreign Application Priority Data
May 22, 2015    (DE) .................. 10 2015 209 496

(51) Int. Cl.
*H04L 9/08* (2006.01)
*H04L 9/12* (2006.01)
(52) U.S. Cl.
CPC .......... *H04L 9/0838* (2013.01); *H04L 9/0861* (2013.01); *H04L 9/12* (2013.01); *H04L 2209/84* (2013.01)
(58) Field of Classification Search
CPC ................. H04L 9/0838; H04L 9/12
See application file for complete search history.

(56) References Cited

U.S. PATENT DOCUMENTS 9,571,277 B2 *  2/2017  Mueller ............... H04L 9/0875
2007/0237180 A1 * 10/2007  Park ..................... H04L 12/56
                                                                    370/474
(Continued)

FOREIGN PATENT DOCUMENTS

CN    103685217 A    3/2014
CN    103842981 A    6/2014
(Continued)

OTHER PUBLICATIONS

Unknown author, "Bit stuffing—Wikipedia", 2 pages, Sep. 5, 2019. (Year: 2019).*

(Continued)

*Primary Examiner* — Ponnoreay Pich
(74) *Attorney, Agent, or Firm* — Maginot, Moore & Beck LLP

(57) ABSTRACT

Disclosed is a method for generating a secret or key in a network having first and second subscribers and a transmission channel therebetween. The first and second subscribers generating first and second sequences of subscriber values to achieve synchronous transmission; and the first and second subscriber each generate a common secret, the first subscriber doing so based on information about the first sequence and a superposition of the second sequence onto the first sequence on the transmission channel, and the second subscriber doing so based on information about the second sequence and the superposition of the second sequence of subscriber values onto the first sequence of subscriber values. At certain intervals or in accordance with a detected sequence of superposed values, the first or second subscriber outputs at least one filler value onto the transmission channel such that an edge change or change in values occurs on the transmission channel.

19 Claims, 4 Drawing Sheets

(56) References Cited

U.S. PATENT DOCUMENTS

| | | | | |
|---|---|---|---|---|
| 2009/0103726 A1* | 4/2009 | Ahmed | ................. | H04L 9/0668 |
| | | | | 380/46 |
| 2013/0275841 A1* | 10/2013 | Prevost | ............... | H03M 13/256 |
| | | | | 714/792 |
| 2014/0223258 A1* | 8/2014 | Hartwich | ............ | H04L 12/4135 |
| | | | | 714/758 |
| 2016/0323101 A1* | 11/2016 | Guillaume | ............... | H04K 1/00 |

FOREIGN PATENT DOCUMENTS

| | | |
|---|---|---|
| DE | 10 2009 002 396 A1 | 10/2010 |
| DE | 10 2009 045 133 A1 | 3/2011 |
| DE | 10 2011 080 476 A1 | 2/2013 |
| DE | 10 2012 215 326 A1 | 3/2014 |
| DE | 10 2015 207 220 A1 | 10/2015 |
| DE | 10 2014 208 975 A1 | 11/2015 |
| DE | 10 2014 209 042 A1 | 11/2015 |

OTHER PUBLICATIONS

Andreas Mueller, English translation of: DE 102012215326A1, 9 pages, publication date: Mar. 6, 2014. (Year: 2014).*

International Search Report corresponding to PCT Application No. PCT/EP2016/058103, dated Jul. 8, 2016 (German and English language document) (7 pages).

Anonymous; On-Off keying; Wikipedia; Apr. 21, 2014; 1 Page; https://en.wikipedia.org/wiki/On-off_keying.

ISO 11898-1, Road Vehicles—Controller area network (CAN)—Part 1: Data link layer and physical signalling; Dec. 1, 2003; 45 Pages; www.iso.org; Geneva, Switzerland.

\* cited by examiner

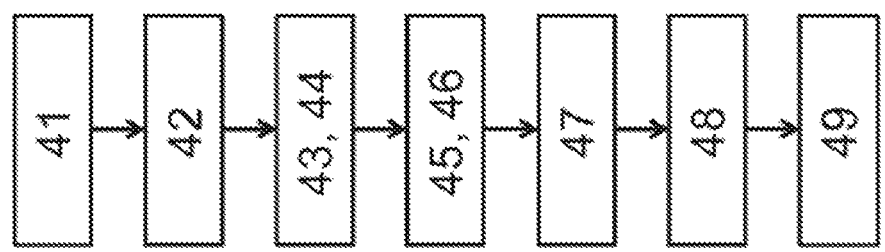

METHOD FOR GENERATING A SECRET OR A KEY IN A NETWORK

This application is a 35 U.S.C. § 371 National Stage Application of PCT/EP2016/058103, filed on Apr. 13, 2016, which claims the benefit of priority to Serial No. DE 10 2015 209 496.0, filed on May 22, 2015 in Germany, the disclosures of which are incorporated herein by reference in their entirety.

The present disclosure relates to a method for generating a secret or a secret cryptographic key in a network, in particular the generation of a common secret key in two users of the network. Point-to-point connections are usually also counted as networks and will also be addressed by this term. In this context, the two users communicate via a commonly utilized transmission medium. In this process, logical bit sequences (or more generally value sequences) are transmitted by corresponding transmission methods physically as signals or signal sequences, respectively. The basic communication system can be, e.g., a CAN bus. This provides a transmission of dominant and recessive bits or correspondingly dominant and recessive signals, respectively, a dominant signal or bit of a user of the network dominating over recessive signals or bits. A state corresponding to the recessive signal only occurs on the transmission medium when all users involved provide a recessive signal for transmission or when all users transmitting simultaneously transmit a recessive signal level.

BACKGROUND

A secure communication between different devices becomes ever more important in an increasingly networked world and constitutes in many areas of application a significant requisite for the acceptance and thus also the economic success of the corresponding applications. Depending on application, this comprises various targets for protection such as, for example, the maintenance of the confidentiality of the data to be transmitted, the mutual authentication of the nodes involved and the securing of the data integrity.

To achieve these targets for protection, conventionally suitable cryptographic methods are used, which can generally be divided into two different categories: on the one hand, symmetric methods in which transmitter and receiver have the same cryptographic key, on the other hand, asymmetric methods in which the transmitter encrypts the data to be transmitted with the public key of the receiver (i.e. also a key possibly known to a potential attacker), but the decryption can only take place with the associated private key which is ideally known only to the receiver.

Asymmetric methods have the disadvantage, among other things, that they have a very high mathematical complexity, as a rule. Thus, they are only conditionally suitable for resource-restricted nodes such as, e.g. sensors, actuators, or the like which usually only have a relatively low computing power and small memory and should operate in an energy-efficient manner, for example due to battery operation or the use of energy harvesting. In addition, there is often only a limited bandwidth available for data transmission, which renders the exchange of asymmetric keys having lengths of 2048 bits or more unattractive.

In the case of symmetric methods, in contrast, it must be guaranteed that both receiver and transmitter have the same key. The associated key management then generally represents a very demanding task. In the field of mobile radio, keys are entered into a mobile telephone, for example, with the aid of SIM cards and the associated network can then correlate the unambiguous identifier of a SIM card with the corresponding key. In the case of wireless LANs, in contrast, the key to be used is normally input manually (as a rule by inputting a password) in the configuration of a network. Such a key management, however, very rapidly becomes very expensive and impracticable if there is a very large number of nodes, for example in a sensor network or other machine-to-machine communication systems, e.g. also CAN-based vehicle networks. In addition, a change of the keys to be used is often not possible at all or only with very great expenditure.

Methods for protecting sensor data against manipulation and securing a transaction authentication, e.g. in a motor vehicle network, with the aid of conventional encryption methods are disclosed, e.g., in DE 102009002396 A1 and in DE 102009045133 A1.

For some time, novel approaches have been examined and developed under the keyword "Physical Layer Security", with the aid of which keys for symmetric methods can be generated automatically on the basis of physical characteristics of the transmission channels between the nodes involved. In this connection, the reciprocity and the inherent randomness of these transmission channels are utilized. Particularly in the case of wire-connected or optical systems, however, this approach is often only suitable to a limited degree since corresponding channels usually have only a very restricted temporal variability and an attacker with the aid of a model formation can draw conclusions regarding the channel parameters relatively well. Such methods for a secure communication in a distributed system based on channel characteristics of the units connected are described, for example, in the previously unpublished applications DE 10 2014 208975 A1 and DE 10 2014 209042 A1.

Methods for bit-stuffing in the Controller Area Network (CAN) and in the CAN FD can be found, for example, in DE 10 2011 080476 A1.

The previously unpublished DE 10 2015 207220 A1 discloses a method for generating a common secret or a secret symmetric key by means of public discussion between two communication users.

SUMMARY

The methods for generating a secret or a cryptographic key according to the disclosure do not require any manual intervention and thus allow for automated setting up of secure communication relations or connections between two nodes. In addition, the methods have very little complexity, particularly with regard to the required hardware design such as, e.g. the storage resources and computing power needed and they are accompanied by little energy and time requirement. In addition, the methods offer very high key generation rates, accompanied by a very low error probability at the same time.

The methods are here based on the concept that users in a network communicate with one another via a communication channel. In doing so, they transmit in particular logical value sequences (if it is binary logic, bit sequences) with the aid of physical signals on the transmission channel. Even if possible superimpositions take place on the transmission channel by the signals, that is to say on the physical plane, the logical plane will be considered primarily hereinafter in the description. Thus, the logical value sequences transmitted and their logical superimposition will be considered.

Users of the network can thus deliver first signals (which are allocated, for example, to the logical bit "1") and second signals (which are allocated, for example, to the logical bit "0") to the communication channel and detect resultant signals on the communication channel. If then two users (largely) simultaneously transmit a signal sequence in each case, the users can detect the resultant superimposition on the communication channel. The effective signal resulting from the (largely) simultaneous transmission of two (independent) signals on the communication channel can then be allocated again to one (or more) particularly logical value (or values), in turn.

In this process, the transmission must be largely synchronous to the extent that a superimposition of the individual signals of a signal sequence takes place on the transmission medium, in particular that the signal corresponding to the nth logical value or bit of the first user is at least partially superimposed with the signal corresponding to the nth logical value or bit of the second user. This superposition should in each case be sufficiently long so that the users can detect the superimposition or determine the corresponding superimposition value, respectively.

In this context, the superimposition can be determined by arbitration mechanisms or by physical signal superimposition. By arbitration mechanism is meant the case, for example, that a node would like to apply a recessive level but detects a dominant level on the bus and thus suppresses the transmission. In this case, there is no physical superimposition of the two signals but only the dominant signal can be seen on the transmission channel.

From the resultant sequence of values of the superimposition and their own sequence of values, the users can then generate a key which is secret to an outside attacker. The reason for this is that the outside attacker which, for example, can listen to the effective overall signals present on the jointly used transmission medium, only sees the superimposition of the sequences of values but does not have the information about the individual value sequences of the users. The users thus have more information which they can utilize with respect to the attacker for generating a secret key.

If the methods described are used in particular systems such as, e.g., CAN, without additional measures, it may occur that relatively long sequences of identical bits or signal levels are present on the jointly used transmission medium (e.g. CAN bus). This can then, in turn, lead to bit-stuffing errors and/or synchronization losses, which possibly initiate other nodes to send special error frames and to abort the process. To avoid this but nevertheless to remain as compatible as possible with already contemporarily available transceivers and controllers it is proposed to extend the methods described for key generation in such a manner that bit-stuffing errors and/or synchronization losses are prevented and the compatibility of these key establishing methods to standard components already available today is thus increased.

For this purpose, it is proposed that the users involved in the key generation provide outside their user value sequences, i.e. additionally to these, at least one stuffing value to the common transmission channel so that a change of edges or a change of values results (e.g. bit change 0 to 1 or 1 to 0 in a binary system). This can only be done by one of the users. In a preferred embodiment, however, both users provide largely synchronously stuffing values to the transmission channel so that a change of edges or a change of values results from the superimposition signal of the stuffing values.

The stuffing values are then provided at particular intervals (i.e. especially after a particular number of individual values of the value sequences) or depending on a detected superimposition value sequence to the transmission channel.

In a preferred embodiment, the users provide the stuffing values to the transmission channel if they detect in each case a superimposition value sequence having a predetermined number of identical values. In this context, the stuffing values are preferably inverse to the detected identical values. Since the stuffing bits or stuffing values generally increase the overhead of a communication protocol and thus reduce the efficiency of the establishment of keys, it is advantageous to provide such stuffing values only if actually a particular number of value repetitions is exceeded which is detected here by means of the superimposition sequence.

If the users are capable of this, the stuffing values can be provided to the transmission channel immediately adjoining the detected number of identical values in the superimposition value sequence. In this variant, the number to be detected can be set precisely to the permissible maximum number of identical values so that the stuffing values are really only inserted in cases in which they are necessary. Otherwise, the stuffing values can also be inserted at a predetermined distance for detection of a number of value repetitions, wherein this number should then be selected to be correspondingly lower than the maximum number. Although a higher overhead is generated by this means, the method is less demanding (particularly with respect to hardware requirements for the users) and can be more reliable.

Even simpler to perform and therefore especially compatible with existing communication systems and user hardware is an alternative embodiment in which the stuffing values are always inserted by the users at fixed predetermined intervals, particularly after a predetermined number of detected values on the transmission channel without there having to be identical values. In this arrangement, preferably two stuffing values are inserted which already contain a change of values or change of edges (e.g. the bit sequence 01 of both users or the bit sequence 10 of both).

Particularly advantageously the method can be used in a network in which there is a dominant value (physically: a dominant signal), which is successful if only one user applies it on the transmission channel, and a recessive value (physically: a recessive signal) which only results on the transmission channel if both or all users, respectively, transmit a recessive value. On the basis of the superimposition rules clearly predetermined herewith, the users of such a network can derive from resultant superimposition sequences information for key generation in a particularly simple manner. Alternatively, the transmission of a recessive value by at least one of the users can also be replaced by nothing being transmitted at this place in the value sequence or as one of the at least two possible values.

The user value sequence which are provided by the users largely simultaneously to the transmission channel are generated in advance in the respective users themselves with the aid of a random number generator or pseudo-random number generator. Since the resultant superimposition sequence can be accessible to a potential attacker on the transmission channel, it is particularly advantageous for the security of the later communication if it is as difficult as possible to the attacker to infer the individual value sequences of the users if these are thus generated in the users locally and randomly or at least pseudo-randomly.

The methods described can be implemented especially well in a CAN, TTCAN or CAN FD bus system. In this case, a recessive bus level is displaced by a dominant bus level. The superimposition of values or signals of the users thus follows specified rules which the users can use to derive information from the superimposed value or signal and the value or signal transmitted by them. The methods are also well suited for further communication systems such as LIN and I2C.

Alternatively, however, the method can also be used, for example, in a network having on-off keying amplitude shift keying. In this case, the superimposition is also specified in that the users can select as signals "transmission" and "no transmission" and the superimposition signal corresponds to the signal "transmission" when one or both of the users transmit and corresponds to the signal "no transmission" when both users are not transmitting.

While the method has been described for two users in one network, a secret key can also be derived from a separate signal sequence and from a superimposition of the latter with the signal sequence of a second user already by a user of a network. A network or a user of a network are configured for this in that they have electronic memory and computing resources which execute steps of a corresponding method. On a storage medium of such a user or on the distributed storage resources of a network, a computer program can also be deposited which is configured to perform all steps of a corresponding method when it is processed in the user or in the network.

BRIEF DESCRIPTION OF THE DRAWINGS

In the text which follows, the disclosure is described in greater detail with reference to the attached drawings and by means of illustrative embodiments, in which FIG. 1 diagrammatically shows the structure of an illustrative basic communication system, FIG. 2 diagrammatically shows a linear bus as an example of a basic communication system, FIG. 3 diagrammatically shows illustrative signal sequences of two users of a network and a resultant superimposition value sequence on a transmission channel between the users, and FIG. 4 diagrammatically shows the sequence of an illustrative method for key generation between two users of a network.

DETAILED DESCRIPTION

The present disclosure relates to a method for generating a common secret or (secret) symmetric cryptographic key between two nodes of a communication system (users of a network) which communicate with one another via a jointly used medium (transmission channel of the network). The generation or negotiation of the cryptographic keys is here based on a public data exchange between the two users, wherein, however, it is not, or only with great difficulty, possible for a third party possibly listening in as attacker to draw conclusions relating to the generated keys. Using the disclosure, it is thus possible to establish between two different users of a network in completely automated and secure manner corresponding symmetrical cryptographic keys in order to implement, on the basis thereof, particular security functions such as, e.g., a data encryption. As will still be described in detail, a common secret is initially established for this purpose which can be utilized for key generation. In principle, however, such a common secret can also be used for other purposes than for cryptographic keys in the narrower sense, e.g. as one-time pad.

The disclosure is suitable for a multiplicity of wire-connected or wireless, and also optical networks or communication systems, particularly also those in which the various users communicate with one another via a linear bus and the media access to this bus takes place by means of a bitwise bus arbitration. This principle represents, for example, the basis of the widely used CAN bus. Possible fields of use of the disclosure comprise correspondingly, in particular, also CAN-based vehicle networks and CAN-based networks in the automation technology.

The present disclosure describes an approach by means of which symmetric cryptographic keys can be generated by automated means in one node, particularly between two nodes, of a network. This generation then takes place by utilizing characteristics of the corresponding transmission layer. Differently from the conventional approaches of the "Physical Layer Security" however, it is not physical parameters of the transmission channel such as transmission intensity, etc. which are evaluated for this purpose. Instead, there is a public data exchange for this purpose between the nodes involved which, thanks to the characteristics of the communication system and/or the modulation method used, does not provide a possible listening attacker with any or any adequate conclusions with respect to the key negotiated therefrom.

Figure 1:
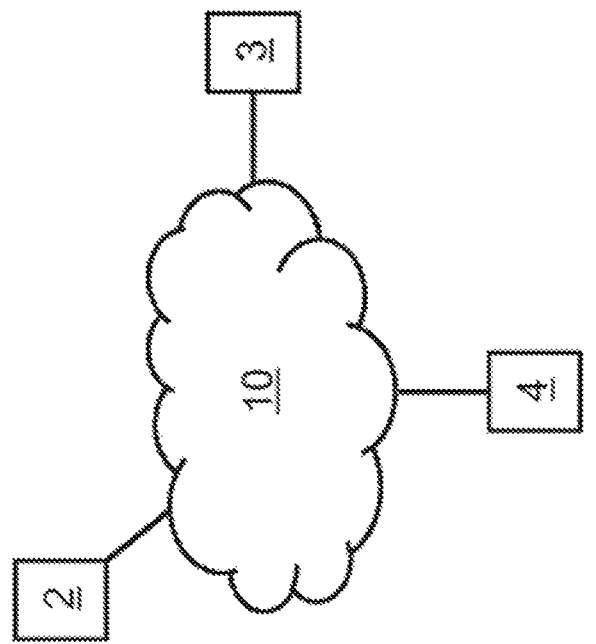
Figure 2:
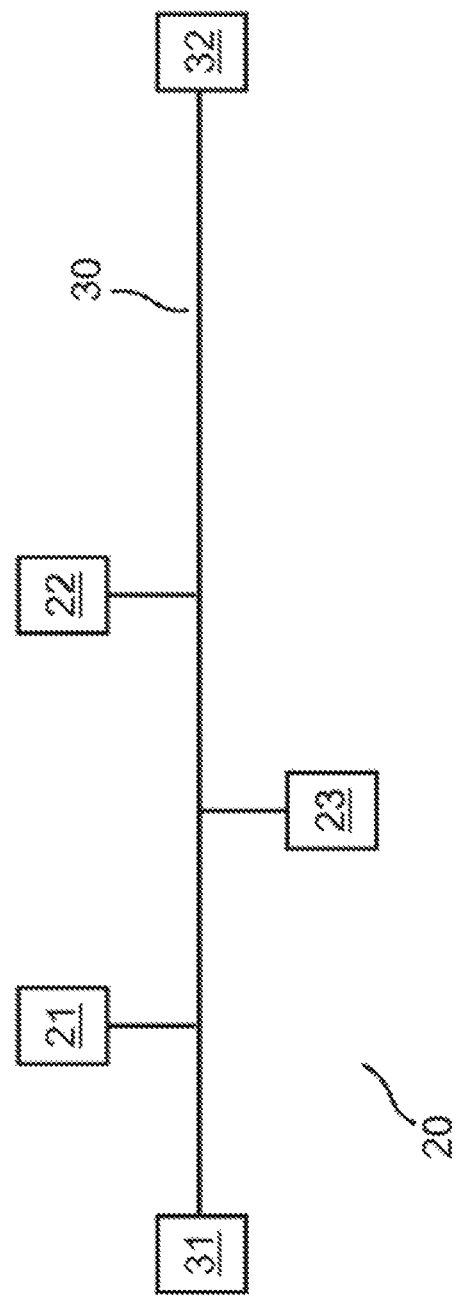

In the text which follows, an arrangement is considered as it is shown abstractly in FIG. 1. In this context, different users 2, 3 and 4 can communicate with one another via a so-called shared transmission medium 10. In an advantageous embodiment of the disclosure, this shared transmission medium corresponds to a linear bus (wire-connected or optical) 30 as it is shown by way of example in FIG. 2. The network 20 in FIG. 2 consists of just this linear bus 30 as shared transmission medium (for example as wire-connected transmission channel), users or nodes 21, 22 and 23 and (optional) bus terminations 31 and 32.

In the text which follows, it is assumed for the communication between the different nodes 21, 22 and 23 that it is characterized by the distinction between dominant and recessive values. In this example, the bits "0" and "1" are assumed as possible values. In this context, a dominant bit (e.g. the logical bit "0") can virtually displace or overwrite a recessive bit (e.g. the logical bit "1") transmitted at the same time.

An example of such a transmission method is the so-called on-off-keying (on-off-keying amplitude shift keying), in which exactly two states of transmission are distinguished: in the first case (value 'on' or "0"), a signal is transmitted, for example in the form of a simple carrier signal, in the other case (value 'off' or "1"), no signal is transmitted. The 'on' state is then dominant whilst the 'off' state is recessive.

Another example of a corresponding communication system which supports this distinction of dominant and recessive bits is a (wire-connected or optical) system based on a bitwise bus arbitration as is used, for example, in the CAN bus. The basic idea here also consists in that, if, for example, two nodes wish to transmit a signal simultaneously and one node transmits a '1' whereas the second node sends a '0', the '0' "wins" (i.e. the dominant bit), i.e. the signal level which can be measured on the bus corresponds to a logical '0'. In the case of CAN, this mechanism is used, in particular, for resolving possible collisions. In this context, higher-priority messages (i.e. messages with earlier, dominant signal level) are transmitted with higher priority in that each node simultaneously monitors the signal level on the bus bit by bit during the transmission of its CAN identifier. If the node itself transmits a recessive bit, but a dominant bit is detected on the bus, the corresponding node aborts its attempted transmission in favor of the higher-priority message (having the earlier, dominant bit).

The distinction between dominant and recessive bits allows the shared transmission medium to be considered as a type of binary operator which links the different input bits (all bits transmitted simultaneously) with one another with the aid of a logical AND function.

Figure 3:
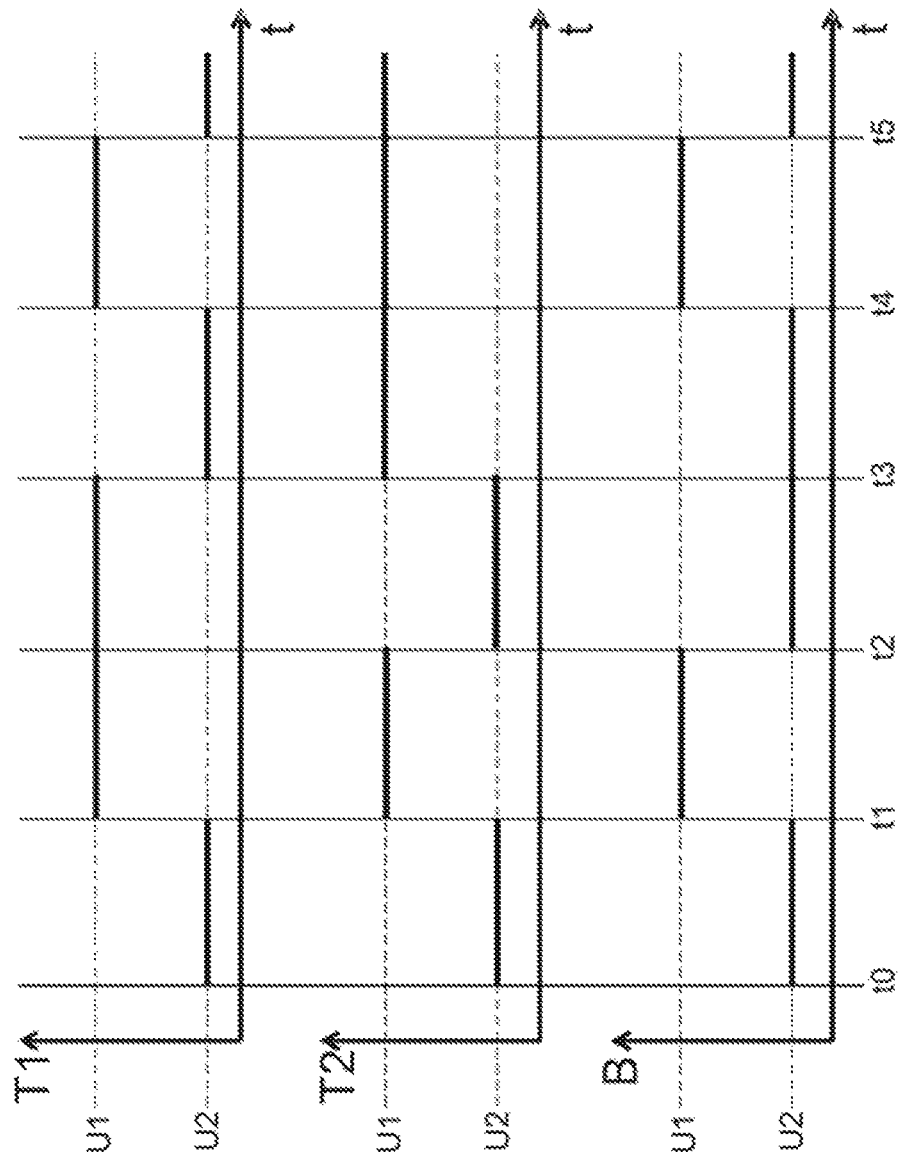

In FIG. 3 it is shown, for example, how a user 1 (T1) keeps the bit sequence 0, 1, 1, 0, 1 ready for transmission between the times t0 and t5 via the transmission channel. User 2 (T2) keeps the bit sequence 0, 1, 0, 1, 1 ready for transmission between times t0 and t5 via the transmission channel. With the characteristics of the communication system described above and with the assumption that in this example the bit level "0" is the dominant bit, the bit sequence 0, 1, 0, 0, 1 will be seen on the bus (B). It is only between times t1 and t2 and between t4 and t5 that both user 1 (T1) and user 2 (T2) provide a recessive bit "1" so that it is only here that the logical AND combination results in a bit level of "1" on the bus (B).

By utilizing these characteristics of the transmission method of the communication system, a key generation can take place between two users of a corresponding network in that the users detect a superimposition of bit sequences of the two users on the transmission medium and generate from this information jointly with information about the self-transmitted bit sequence a common (symmetric) secret key.

In the text which follows, an illustrative, particularly preferred implementation is explained by means of FIG. 4.

The process for generating a symmetric pair of keys is started in step 41 by one of the, in the present example two, nodes involved (user 1 and user 2). This can take place, for example, by sending a special message or a special message header.

Both user 1 and user 2 initially generate in step 42 a bit sequence locally (i.e. internally and mutually independently). This bit sequence is preferably at least twice, particularly at least three times as long as the joint key desired as a result of the method. The bit sequence is preferably in each case generated as a random or pseudo-random bit sequence, for example with the aid of a suitable random number generator or pseudo-random number generator.

Example of local bit sequences of 20-bit lengths:
Generated bit sequence of user 1:
  $S_{T1}$=01001101110010110010
Generated bit sequence of user 2:
  $S_{T2}$=10010001101101001011

In a step 43, user 1 and user 2 transmit to one another (largely) synchronously their bit sequences generated in each case via the shared transmission medium (by using the transmission method with dominant and recessive bits as already explained before). In this context, various possibilities for synchronizing the corresponding transmissions are conceivable. Thus, for example, either user 1 or user 2 could initially send a suitable synchronization message to the other node in each case and after a particular period of time following the complete transmission of this message then start the transmission of the actual bit sequences. Just as well, it is also conceivable, however, that only one suitable message header is transmitted by one of the two nodes (e.g. a CAN header consisting of arbitration field and control field) and during the associated payload phase then both nodes simultaneously convey their generated bit sequences (largely) synchronously. In a variant of the method, the bit sequences of a user generated in step 42 can also be transmitted in a manner distributed over several messages, for example in step 43 if the (maximum) sizes of the corresponding messages make this necessary. In this variant, too, the transmission of the bit sequences of the other user distributed over a corresponding number of correspondingly large messages occurs again (largely) synchronously.

On the shared transmission medium, the two bit sequences become superimposed then wherein, due to the previously required characteristic of the system comprising the distinction of dominant and recessive bits, the individual bits of user 1 and user 2 result in a superimposition, being de facto AND-combined in the cited example. This results in a corresponding superimposition on the transmission channel which, for example, a third-party user listening in could detect.

Example of a superposition bit sequence for the above local bit sequences:
Effective bit sequence on the transmission channel:
  $S_{eff}$=$S_{T1}$ AND $S_{T2}$=00000001100000000010

Both user 1 and user 2 detect during the transmission of their bit sequences of step 43 in a parallel step 44 the effective (superimposed) bit sequences $S_{eff}$ on the shared transmission medium. For the example of the CAN bus, this is usually done in any case also in conventional systems during the arbitration phase.

This is correspondingly also possible for systems having 'On-Off-Keying' (wireless, wire-connected or optical). The practical implementability is benefitted particularly by the fact that in such a system, the 'On' state is dominant and the 'Off' state is recessive (as already explained before). In consequence, a node knows also without measuring that the effective state on the "shared medium" is dominant if the node itself sent a dominant bit. If, in contrast, a node has sent a recessive bit, it does not initially readily know the state on the shared transmission medium, but it can nevertheless determine in this case by a suitable measurement what it looks like. Since the node itself is not sending anything in this case there are, therefore, also no problems with so-called inherent interference, which would otherwise, especially in the case of wireless systems, make complex echo compensation necessary.

In a next step 45, both user 1 and user 2 likewise again transmit (largely) synchronously their initial bit sequences $S_{T1}$ and $S_{T2}$ but this time inverted. The synchronization of the corresponding transmissions can then be achieved again in exactly the same way as described above. On the shared communication medium, the two sequences are then AND-combined again with one another. User 1 and user 2 in turn determine the effective superimposed bit sequences $S_{eff}$ on the shared transmission medium.

Example for the above bit sequences:
Inverted bit sequence of user 1:
  $S_{T1}$'=10110010001101001101
Inverted bit sequence of user 2:
  $S_{T2}$'=01101110010010110100
Effective, superimposed bit sequence on the channel:
  $S_{eff}$'=$S_{T1}$' AND $S_{T2}$'=00100010000000000100

Both user 1 and user 2 then determine during the transmission of their now inverted bit sequences again the effective superimposed bit sequences on the shared transmission medium. At this time both nodes (user 1 and user 2) and also a possible attacker (e.g. user 3) who listens in to the communication on the shared transmission medium thus know the effective, superimposed bit sequences $S_{eff}$ and $S_{eff}$'. In contrast to the attacker or third user, however, user 1 still knows its initially generated local bit sequence $S_{T1}$ and user 2 still knows its initially generated local bit sequence $S_{T2}$.

User 1, in turn, does not however know the initially generated local bit sequence of user 2 and user 2 does not know the initially generated local bit sequence of user 1. The detection of the superimposition bit sequence, in turn, takes place during the transmission in step 46.

As an alternative to this illustrative embodiment variant, user 1 and user 2 can also send their inverted local bit sequence directly with or directly after their original local bit sequence, i.e. steps 45 and 46 occur with steps 43 and 44. The original bit sequence and the inverted bit sequence can then be transmitted in one message, or else in separate messages as partial bit sequences.

In step 47, user 1 and user 2 then in each case combine the effective superimposed bit sequences ($S_{\textit{eff}}$ and $S_{\textit{eff}}'$) locally (i.e. internally), particularly with a logical OR function.

Example for the above bit sequences:
$S_{ges} = S_{\textit{eff}}$ OR $S_{\textit{eff}}' = 00100011100000000110$ The individual bits in the bit sequence ($S_{ges}$) resulting from the OR combination now specify whether the corresponding bits of $S_{T1}$ and $S_{T2}$ are identical or different. If the nth bit within $S_{ges}$ is, for example, a '0', this means that the nth bit within $S_{T1}$ is inverse to the corresponding bit within $S_{T2}$. Similarly, it applies that if the nth bit within $S_{ges}$ is a '1', the corresponding bits within $S_{\textit{Alice}}$ and $S_{bob}$ are identical.

User 1 and user 2 thereupon cross out in step 48, on the basis of the bit sequence $S_{ges}$ obtained from the OR combination, in their original initial bit sequences $S_{T1}$ and $S_{T2}$, all bits which are identical in both sequences.

In consequence, this leads to correspondingly shortened bit sequences.

Example for the above bit sequences:
Shortened bit sequence of user 1:
$S_{T1,V} = 01011100101100$
Shortened bit sequence of user 2:
$S_{T2,V} = 10100011010011$ The resultant shortened bit sequences $S_{T1,V}$ and $S_{T2,V}$ are then precisely inverse to one another. Thus, one of the two users can determine via inversion of his shortened bit sequences precisely the shortened bit sequence such as it is already present in the other user.

The shortened bit sequence jointly present in this way is then edited by user 1 and user 2 in step 49 in each case locally in a suitable manner in order to generate the actually desired key of the desired length N. Here, too, there is again a multiplicity of possibilities how this editing can take place. One possibility is the selection of N bits from the shortened bit sequence jointly present, where it must be defined clearly which N bits are to be taken, e.g. by simply always selecting the first N bits of the sequence. The calculation of a hash function over the jointly present shortened bit sequence is also possible, which delivers a hash value of length N. Quite generally, the editing can take place with any linear and nonlinear function which, when applied to the jointly present shortened bit sequence returns a bit sequence of length N bits. The mechanism of key generation from the jointly present shortened bit sequence is preferably available identically in both users 1 and 2 and is correspondingly performed in the same way.

Following the key generation, it may possibly also be verified that the keys generated by user 1 and 2 are actually identical. For this purpose, a checksum could be calculated over the generated keys and exchanged between user 1 and 2, for example. If both checksums are not identical, something has obviously gone wrong.

In this case, the method for key generation could be repeated.

In a preferred variant of the method for key generation, a whole series of resultant shortened bit sequences present at user 1 and 2 in each case which are then combined to form a single large sequence before the actual key is derived from them could initially also be generated in various runs. If necessary, this can also take place adaptively. If after the single run of the procedure described, the length of the common, shortened bit sequence is, for example, smaller than the desired key length N, further bits could be generated before the actual key derivation by another run, for example.

The generated symmetric pair of keys can then finally be used by user 1 and user 2 in conjunction with established (symmetric) cryptographic methods such as, e.g., ciphers for data encryption.

One aim of combining the two superimposition part-value sequences, particularly with the aid of a logical OR function, is to be able to perform a crossing out of those bits which a passive attacker who is observing the communication can also easily determine on the basis of his observations. An alternative to this would be to keep these bits but instead to initially generate significantly more bits than desired (i.e. if, e.g., a secret or a key of 128 bits is desired, 300 bits should be generated initially) and then to reduce these at the end, e.g. with the aid of a hash function or the like, to the desired length.

A possible attacker (e.g. user 3) can monitor the public data transmission between user 1 and user 2 and thus, as described, gain knowledge of the effective superimposed bit sequences ($S_{\textit{eff}}$ and $S_{\textit{eff}}'$). However, the attacker then only knows which bits are identical in the locally generated bit sequences of user 1 and 2 and which are not. In the case of the identical bits, the attacker can additionally even determine whether this is a '1' or a '0'. For a complete knowledge of the resultant shortened bit sequence (and thus the basis for the key generation) he is still lacking the information about the non-identical bits, however. To further impede possible attacks for the attacker, the bit values identical in the original, locally generated bit sequences of users 1 and 2 are additionally deleted in a preferred variant. User 3 thus only has information which is not used at all for key generation. Although he knows that correspondingly shortened bit sequences emerge from the different bits between the local bit sequences of user 1 and user 2, he does not know which bits have been sent in each case by user 1 and user 2.

User 1 and 2 have, additionally to the information about the superimposed total bit sequence, also the information about the locally generated bit sequence sent by them in each case. From this gain in information compared with a user 3 only following the public data transmission, comes the fact that the keys generated in user 1 and 2 remain secret as basis in spite of the public data transmission.

With the methods for key generation described, it may happen that relatively long sequences of identical bits or signal levels are effectively present on the transmission channel in the simultaneous transmission by users 1 and 2. The reason for this is that both users initially generate random bit sequences independently of one another but on the channel, in each case only a superimposition of these bit sequences is effectively present. This can be, e.g., a bit sequence combined with an AND combination with the assumption of a dominant bit 0 and a recessive bit 1.

Since the two users do not know the randomly generated bit sequence of the other user in each case, it may initially always happen that the effective bit sequence has almost arbitrarily long subsequences having identical successive bits. This, in turn, can be problematic in particular communication systems when using standard hardware and software which is to be explained in greater detail in the text which follows using the example of CAN.

The CAN protocol prescribes that, after N=5 successive equal-value bits, a so-called 'stuffing bit' with complementary value has to be inserted into the bit sequence actually to be transmitted which is automatically removed again at the receiver. These 'stuffing bits' are thus not information bits but have the following background:
1) Bit sequences having more than N=5 successive equal-value bits are used for control purposes (e.g. as "End-of-Frame" indication or as "Error Frame") and it must be ensured, therefore, that such sequences do not occur in the actual information part.
2) CAN uses a non-return-to-zero coding for the transmission of CAN messages. However, this favors synchronization losses due to clocks which are not perfectly synchronous in various nodes which is why a temporal resynchronization must be performed during the transmission or the reception of a CAN message in order to be able to keep the demands on the hardware low (e.g. demands on the local oscillators). By introducing a "stuffing bit", a change of edges occurs after N=5 successive bits, at the latest, which can then be used for resynchronization.

If the "bit-stuffing rule" in CAN is violated, all users who discover this violation immediately transmit an 'error flag' (=6 or more successive dominant bits) and attempt by this means to terminate the process.

This, in turn, prevents the successful establishment of symmetric cryptographic keys with the methods outlined briefly above.

In the text which follows, extensions of the methods described are therefore presented, with the aid of which bit-stuffing errors can be avoided so that, e.g. in the case of CAN, no "error flags" are sent by other nodes on the basis of such an error. At the same time, it can thus be ensured that a regular temporal resynchronization by the users of the communication system is possible and thus the probability of synchronization errors can be reduced. Depending on the type of communication system, both aspects may be of significance, or also only one of them.

By introducing suitable "stuffing bits" it is intended to prevent that more than N successive bits have the same value. However, this cannot take place by means of transmission rules for the individual users independently of the remaining users since in the method described, it is a matter of corresponding changes of edges or changes of values of a superimposition value sequence. For this purpose, various options are proposed.

In a first preferred embodiment, the fact is utilized that the first and the second user in the methods for key generation described, during the synchronous transmission of the random bit sequences in step 43 in any case always detect the effective signal level (or the effective bit sequence) on the jointly utilized transmission medium in the parallel step 44. If the nodes find in this context that the effective bit value is always the same N-times in succession in the transmission medium, both nodes next send a stuffing bit which is inverse to the effective bit present N-times in succession. An essential difference from the conventional bit-stuffing is thus that the decision whether a stuffing bit has to be inserted primarily does not depend on the actual message or bit sequence but exclusively on the effective bit sequence on the jointly used transmission medium. The same applies to the value of the stuffing bit which is to be sent.

Example

Random, initial (locally generated) bit sequence of user 1:
0 1 1 0 1 0 1 1 0 1 1 0 1 0 1

Random, initial (locally generated) bit sequence of user 2:
0 1 0 1 0 0 0 1 1 1 1 0 1 1

Effective bit sequence on the transmission medium with logical AND combination of the individual sequences without stuffing bits:
0 1 0 0 0 0 0 0 1 1 0 0 0 1

If N=5 (as, e.g. in the case of CAN), there would thus be a stuffing error since the effective bit value '0' is present on the transmission medium seven-times in succession.

Given the approach proposed above according to the first illustrative embodiment, in contrast, the following bit sequence would actually be present on the transmission medium:
0 1 0 0 0 0 0 <u>1</u> 0 0 1 1 0 0 0 1

The bit underlined is here the additionally introduced stuffing bit which is inserted both by user 1 and by user 2 and sent after they have detected the bit '0' five-times on the common transmission medium. The bit sequences of Alice and Bob actually sent accordingly look as follows for this example:

Bit sequence of user 1 actually sent:
0 1 1 0 1 0 1 <u>1</u> 1 0 1 1 0 1 0 1

Bit sequence of user 2 actually sent:
0 1 0 1 0 0 0 <u>1</u> 0 1 1 1 1 0 1 1

In comparison with the above initial bit sequences generated randomly and locally, of the users 1 and 2, the corresponding stuffing bit (here 1) was thus inserted at position 8.

In a second preferred embodiment, it is taken into consideration that in some communication systems, it may be difficult for users (e.g. because of the use of cost-effective simple hardware), to insert a stuffing bit (as shown above) immediately after the detection of a sequence of N identical successive bits on the transmission medium since both the detection of a bit and the preparation of the transmission of the next bit will need some time, depending on implementation, and thus a sufficiently quick reaction is not possible in some circumstances. In such a case, the approach of the first illustrative embodiment can be adapted in such a manner that, already after the detection of N−M (1≤M≤N−2) identical successive effective bits on the jointly used transmission medium, the insertion of a stuffing bit is prepared but this is actually sent only after the transmission of N bits calculated from the detection of the first bit of the sequence of (at least) N−M identical successive bits.

In a particularly robust variant, this prepared stuffing bit itself is sent if, after the N−M identical bits and before the transmission of the stuffing bit, an (effective) bit change takes place on the common transmission medium and thus there is actually no stuffing error (since even without the stuffing bit, no more than N identical bits would be present on the transmission medium in this case). This also leads to a valid bit sequence (without stuffing error) but in this case with a greater overhead due to the (here actually unnecessary) stuffing bit.

Example (N=5, M=2)

Firstly, it is assumed that the initial generated bit sequences of users 1 and 2 are identical to the example of the first embodiment variant, i.e.: Random, initial (locally generated) bit sequence of user 1:
0 1 1 0 1 0 1 1 0 1 1 0 1 0 1

Random, initial (locally generated) bit sequence of user 2:
0 1 0 1 0 0 0 1 1 1 1 0 1 1

Effective bit sequence on the transmission medium with logical AND combination of the individual sequences without stuffing bits:
0 1 0 0 0 0 0 0 0 1 1 0 0 0 1

During the transmission, however, both Alice and Bob would detect after the transmission of bit 5 that N–M=3 successive identical bits had formed on the jointly used transmission medium and then prepare the insertion of a stuffing bit at position 8 (with the value '1').

The bit sequences actually transmitted by Alice and Bob thus correspond (analogously to before):

Actually transmitted bit sequence of user 1:
0 1 1 0 1 0 1 1 1 0 1 1 0 1 0 1

Actually transmitted bit sequence of user 2:
0 1 0 1 0 0 0 1 0 1 1 1 1 0 1 1 From this follows the bit sequence actually present on the transmission medium:
0 1 0 0 0 0 0 1 0 0 1 1 0 0 0 1

The bit underlined is again the stuffing bit additionally inserted which is inserted both by user 1 and also by user 2 and transmitted after they have detected the bit '0' on the common transmission medium three-times after bit 5. Here, too, no further bit-stuffing error would thus occur (with N=5) and one would have exactly the same result as in the previous example. However, both user 1 and user 2 would have more time to prepare the insertion and transmission of the stuffing bit, respectively.

A method for avoiding stuffing errors and/or synchronization losses according to a third preferred illustrative embodiment is the periodic enforcement of bit changes or changes of edges independently of the actual information bits, i.e. independently of user sequences and independently of the detected superimposition sequence. This can be designed in such a way that both user 1 and user 2 always insert, after the transmission of K (with K<N) information bits (originally randomly generated bits), two stuffing bits which, in the case of superimposition, lead to a bit change or change of edges. In certain communication systems such as CAN, the two stuffing bits can for this purpose already contain a bit change, e.g. either the bit sequence '01' or '10', so that the bit sequences '01' or '10' likewise result the superimposition. Which of these two possible cases is inserted is insignificant in this example as long as it is ensured that both user 1 and user 2 always insert the same sequence.

This embodiment variant leads to a relatively high overhead, but nevertheless very robust and inexpensively achievable and can also be carried out particularly well with existing standard components.

Example (N=5, K=4)

Firstly, it is assumed that the initial generated bit sequences of users 1 and 2 are identical as in the example of the first and second embodiment variant, i.e.:

Random, initial (locally generated) bit sequence of user 1:
0 1 1 0 1 0 1 1 0 1 1 0 1 0 1

Random, initial (locally generated) bit sequence of user 1:
0 1 0 1 0 0 0 0 1 1 1 1 0 1 1

Effective bit sequence on the transmission medium with logical AND combination of the individual sequences without stuffing bits:
0 1 0 0 0 0 0 0 0 1 1 0 0 0 1

Always after K=4 bits, the bit sequence '01' is inserted, however, both by user 1 and user 2 independently of the information bits. The bit sequences of user 1 and user 2 actually to be transmitted thus result as:

Bit sequence of user 1 actually to be transmitted:
0 1 1 0 0 1 1 0 1 1 0 1 0 1 1 0 0 1 1 0 1

Bit sequence of user 2 actually to be transmitted:
0 1 0 1 0 1 0 0 0 0 0 1 1 1 1 1 0 1 0 1 1

Thus, the following effective bit sequence is obtained on the common transmission medium:
0 1 0 0 0 1 0 0 0 0 0 1 0 1 1 0 0 1 0 0 1

Thus, no stuffing error occurs also in this case (with N=5).

Independently of which of the approaches described is used, the stuffing bits themselves are preferably discarded on the receiver side. In particular, they are not used as basis for the generation of a symmetric cryptographic key in a relative manner, in order to prevent a weakening of the key by taking into consideration non-random structures in the key generation.

In an alternative embodiment, the embodiments of the method described can also be modified in such a manner that the stuffing values (stuffing bits) are not provided by both users to the common transmission medium but that only one of the two users generates and outputs the stuffing values. This method has the advantage that the users can resynchronize themselves via this value sequence with respect to one another. For this alternative, preferably one of the users is intended to transmit the stuffing values. This can be, e.g., the user who initiates the key generation or a user predetermined (e.g. by configuration). The other user detects the stuffing values and can obtain by means of these, for example, synchronization information. In particular, a possible time-offset of his clock to the clock of the other user can be detected by means of at least one stuffing value and, on the basis of this offset determined, a resynchronization of his clock can be performed.

The methods presented represent an approach to generating symmetric cryptographic keys between two nodes by utilizing characteristics of the bit transmission layer. The approach is particularly suitable for wire-connected and optical communication systems if these support 'On-Off-keying' and a bitwise bus arbitration (e.g. CAN, TTCAN, CAN-FD, LIN, I2C). However, the approach can also be used in wireless (radio-based) communication systems, preferably having a very short distance between transmitter and receiver and a possible direct visual link.

In principle, it can be used for all communication systems which provide for a distinction of dominant and recessive bits (as described above). The methods described here can thus be used with a plurality of wireless, wire-connected and optical communication systems. Of particular interest is the approach described for the machine-to-machine communication, i.e. for the transmission of data between different sensors, actuators, etc. which generally only have very limited resources and may not be configurable manually in the field with reasonable expenditure.

There are further possibilities of utilization for example in home and building automation, in telemedicine, car-to-X systems or industrial automation technology. Of particular interest is also the use with future microsensors with radio interface and in all application areas of the CAN bus, i.e. particularly vehicle networking or automation technology.

The invention claimed is:

1. A method for generating a key in a network, the network having at least a first user and a second user with a common transmission channel between at least the first user and the second user, the first user being configured to provide at least a first value and a second value to the common transmission channel, the second user being configured to provide at least the first value and the second value to the common transmission channel, the method comprising:
- synchronously transmitting, on the common transmission channel, a first user value sequence by the first user and a second user value sequence by the second user;
- generating a common key, by the first user, based on information about the first user value sequence and based on a superimposition value sequence resulting from a superimposition of the first user value sequence with the second user value sequence on the common transmission channel;
- generating a common key, with the second user, based on information about the second user value sequence and based on the superimposition value sequence resulting from the superimposition of the first user value sequence with the second user value sequence on the common transmission channel;
- providing at least one stuffing value to the common transmission channel such that one of a change of edges and a change of values takes place on the common transmission channel,
- wherein the one of the change of edges and the change of values is performed by providing the at least one stuffing value to the common transmission channel:
  (i) at particular intervals or
  (ii) depending on a detected superimposition value sequence by the first user outside of the first user value sequence (ii) or by the second user outside of the second user value sequence, and
- wherein only one of the first user and the second user applies the at least one stuffing value to the common transmission channel, the method further comprising:
- detecting the at least one stuffing value by the other one of the first user and the second user.

2. The method as claimed in claim 1, the method further comprising:
- determining, by the other one of the first user and the second user, synchronisation information using the detected stuffing value.

3. The method as claimed in claim 1, the providing of the at least one stuffing value further comprising:
- providing, by the first user, at least one first stuffing value outside the first user value sequence and, by the second user synchronous therewith, at least one second stuffing value outside the second user value sequence to the common transmission channel such that the one of the change of edges and the change of values takes place on the common transmission channel due to a superimposition of the at least one first stuffing value and the at least one second stuffing value.

4. The method as claimed in claim 1, further comprising:
- applying, by one of the first user the second user, the stuffing value to the common transmission channel in response to a superimposition value sequence having a predetermined number of identical values being detected by one of the first user the second user.

5. The method as claimed in claim 4, the providing of the at least one stuffing value further comprising:
- applying the at least one stuffing value directly as next value to the common transmission channel as soon as the superimposition value sequence having the predetermined number of identical values is detected.

6. The method as claimed in claim 4, the providing of the at least one stuffing value further comprising:
- applying the at least one stuffing value with a delay by a certain number of values to the common transmission channel after the superimposition value sequence having the predetermined number of identical values is detected.

7. The method as claimed in claim 6, the providing of the at least one stuffing value further comprising:
- applying the stuffing value in fixed predetermined intervals, after a predetermined number of values of the first and second user value sequences applied to the channel, to the common transmission channel.

8. The method as claimed in claim 4, wherein the stuffing value is inverse to the detected identical values.

9. The method as claimed in claim 1, the providing of the at least one stuffing value further comprising:
- applying at least two stuffing values to the common transmission channel.

10. The method as claimed in claim 9, wherein the two stuffing values contain a change of values.

11. The method as claimed in claim 1, wherein, on the transmission channel:
- a state corresponding to the first value occurs when both the first user and the second user initiate a transmission of the first value over the common transmission channel; and
- a state corresponding to the second value occurs when at least one of the first user and the second user initiate a transmission of the second value over the common transmission channel.

12. The method as claimed in claim 1, the synchronously transmitting further comprising:
- generating the first user value sequence in the first user locally using one of a random number generator and pseudo-random number generator; and
- generating the second user value sequence in the second user locally using one of a random number generator and pseudo-random number generator.

13. The method as claimed in claim 1, wherein the at least one first stuffing value and the at least one second stuffing value are not utilized for generating the common key.

14. The method as claimed in claim 1, further comprising:
- providing, in the network, an on-off-keying amplitude shift keying configured to transmit data.

15. The method of claim 1, further comprising:
- providing a computer program stored on a machine-readable storage medium configured to perform the synchronously transmitting, the generating by the first user, the generating by the second user, and the providing of the at least one stuffing value.

16. A method for generating a key with a first user of a network, the first user being configured to receive information via a common transmission channel from a second user of the network and to transmit information to the second user, the first user being configured to provide at least a first value and a second value to the common transmission channel and to be able to detect the first value and the second value, the method comprising:
- transmitting, by the first user, a first user value sequence synchronously to a transmission of a second user value sequence by the second user on the common transmission channel;
- generating a common key, by the first user based on information about the first user value sequence and based on the basis of a superimposition value sequence which results on the common transmission channel from the superimposition of the first user value sequence with the second user value sequence; and
- providing, by the first user, at least a first stuffing value outside the first user value sequence to the common transmission channel, such that one of a change of edges and a change of values takes place on the transmission channel, wherein the one of the change of edges and the change of values is performed by providing the at least one stuffing value to the common transmission channel:
(i) at particular intervals, or
(ii) depending on a detected superimposition value sequence, and wherein only one of the first user and the second user applies the at least one stuffing value to the common transmission channel, the method further comprising:

detecting the at least one stuffing value by the other one of the first user and the second user.

17. The method as claimed in claim 16, wherein the network is one of a CAN, TTCAN, CAN-FD, LIN and I2C bus system, in which the first value is a recessive bus level and the second value is a dominant bus level.

18. The method of claim 16, further comprising:
providing a device configured to perform the transmitting, the generating, and the providing of the at least one stuffing value as a node of the network.

19. A network comprising:
a common transmission channel;
a first user, the first user being configured to provide at least a first value and a second value to common transmission channel;
a second user, the second user being configured to provide at least the first value and the second value to the common transmission channel; and
wherein the first user is configured to transmit a first user value sequence on the common transmission channel and the second user is configured to transmit a second user value sequence on the common transmission channel synchronously with the transmission of the first user value sequence, wherein the first user is configured to generate a common key, based on information about the first user value sequence and based on a superimposition value sequence resulting from a superimposition of the first user value sequence with the second user value sequence, wherein the second user is configured to generate a common key, based on information about the second user value sequence and based on the superimposition value sequence resulting from the superimposition of the first user value sequence with the second user value sequence on the common transmission channel, wherein at least one stuffing value is provided to the transmission channel one of (i) by the first user outside of the first user value sequence and (ii) by the second user outside of the second user value sequence, such that one of a change of edges and a change of values takes place on the common transmission channel, and wherein the change of edges and the change of values is performed by providing the at least one stuffing value to the common transmission channel:
(i) at particular intervals or
(ii) depending on a detected superimposition value sequence, and wherein only one of the first user and the second user applies the at least one stuffing value to the common transmission channel, the method further comprising:

detecting the at least one stuffing value by the other one of the first user and the second user.

\* \* \* \* \*

UNITED STATES PATENT AND TRADEMARK OFFICE
CERTIFICATE OF CORRECTION

PATENT NO. : 10,841,085 B2
APPLICATION NO. : 15/575839
DATED : November 17, 2020
INVENTOR(S) : Lothspeich et al.

Page 1 of 1

It is certified that error appears in the above-identified patent and that said Letters Patent is hereby corrected as shown below:

In the Claims

Claim 1, at Column 15, Line 29: delete "value sequence (ii) or by" and insert --value sequence or by--.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*